United States Patent
Morgan et al.

(10) Patent No.: US 11,435,080 B1
(45) Date of Patent: Sep. 6, 2022

(54) COMBUSTOR HAVING FUEL SWEEPING STRUCTURES

(71) Applicant: General Electric Company, Schenectady, NY (US)

(72) Inventors: Dana Morgan, Greenville, SC (US); Shreekrishna Rao, Simpsonville, SC (US); Lucas John Stoia, Taylors, SC (US); Elizabeth Leigh Exley, Greenville, SC (US); Mohan Krishna Bobba, Simpsonville, SC (US); Emily Klara Happ, Greenville, SC (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 17/350,652

(22) Filed: Jun. 17, 2021

(51) Int. Cl.
  *F23R 3/00* (2006.01)
  *F23R 3/06* (2006.01)
  *F02C 3/04* (2006.01)

(52) U.S. Cl.
  CPC ............. *F23R 3/06* (2013.01); *F02C 3/04* (2013.01); *F05D 2220/30* (2013.01); *F05D 2240/35* (2013.01)

(58) Field of Classification Search
  None
  See application file for complete search history.

(56) References Cited

U.S. PATENT DOCUMENTS

| | | | |
|---|---|---|---|
| 5,327,718 A * | 7/1994 | Iwata | F23R 3/12 60/773 |
| 8,601,820 B2 | 12/2013 | Byrne et al. | |
| 8,707,704 B2 | 4/2014 | Simons et al. | |
| 9,267,687 B2 | 2/2016 | Khan et al. | |
| 9,291,350 B2 | 3/2016 | Melton et al. | |
| 9,310,078 B2 | 4/2016 | Chen et al. | |
| 9,316,155 B2 | 4/2016 | DiCintio et al. | |
| 9,322,553 B2 | 4/2016 | Parsania et al. | |
| 9,383,104 B2 | 7/2016 | Melton et al. | |
| 9,593,851 B2 | 3/2017 | Shershnyov et al. | |
| 9,951,693 B2 | 4/2018 | Elwasila et al. | |
| 10,228,141 B2 | 3/2019 | Cihlar et al. | |
| 10,513,987 B2 * | 12/2019 | Hughes | F23R 3/002 |
| 2014/0260272 A1 * | 9/2014 | DiCintio | F01D 9/023 60/739 |

(Continued)

OTHER PUBLICATIONS

U.S. Appl. No. 16/916,483, filed Jun. 30, 2020.

*Primary Examiner* — Edwin Kang
(74) *Attorney, Agent, or Firm* — Dority & Manning, P.A.

(57) ABSTRACT

A combustor includes at least one fuel nozzle extending from the end cover and at least partially surrounded by the forward casing. The combustor further includes a fuel injection assembly. The fuel injection assembly includes a fuel injector that extends through the outer sleeve, the annulus, and the combustion liner to the secondary combustion zone. A fuel supply conduit positioned outside of the outer sleeve. The fuel supply conduit extends to the fuel injector. The fuel injection assembly further includes a shielding assembly coupled to the outer sleeve and at least partially surrounding the fuel supply conduit. The shielding assembly includes a venturi nozzle having a circumferentially converging portion and a circumferentially diverging portion. At least one fuel sweep opening is defined in the outer sleeve and disposed within the shielding assembly.

20 Claims, 6 Drawing Sheets

(56) References Cited

U.S. PATENT DOCUMENTS

| | | | |
|---|---|---|---|
| 2015/0159877 A1* | 6/2015 | Stoia | F23R 3/346 |
| | | | 60/735 |
| 2016/0265781 A1 | 9/2016 | Carnell, Jr. et al. | |
| 2016/0265782 A1* | 9/2016 | Bhagat | F23R 3/002 |
| 2017/0254542 A1* | 9/2017 | Cihlar | F23R 3/34 |
| 2017/0268784 A1* | 9/2017 | Crawley | F23R 3/002 |
| 2018/0087693 A1 | 3/2018 | Dhanasekaran et al. | |

* cited by examiner

COMBUSTOR HAVING FUEL SWEEPING STRUCTURES

FIELD

The present disclosure relates generally to a turbomachine combustor. In particular, the present disclosure relates to a combustor having structure that induces fuel sweeping flows of air.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

In some combustors, the generation of combustion gases occurs at two, axially spaced stages. Such combustors are referred to herein as including an "axial fuel staging" (AFS) system, which delivers fuel and an oxidant to one or more fuel injectors downstream of the head end of the combustor. In a combustor with an AFS system, a primary fuel nozzle at an upstream end of the combustor injects fuel and air (or a fuel/air mixture) in an axial direction into a primary combustion zone, and an AFS fuel injector located at a position downstream of the primary fuel nozzle injects fuel and air (or a second fuel/air mixture) as a cross-flow into a secondary combustion zone downstream of the primary combustion zone. The cross-flow is generally transverse to the flow of combustion products from the primary combustion zone.

The AFS fuel injectors are typically supplied with fuel by one or more fluid conduits that extend generally axially along an outer sleeve of the combustor. In some instances, one or more components of the AFS system (such as the fuel conduits) may wear over time causing fuel to leak around the combustor. It is important that the leaked fuel be kept away from any high temperature components of the combustor in order to prevent auto ignition of the leaked fuel, which could damage or destroy components of the combustor.

Accordingly, an improved combustor having an AFS system that advantageously reduces risk of damage from leaked fuel would be desired in the art.

BRIEF DESCRIPTION

Aspects and advantages of the combustors and turbomachines in accordance with the present disclosure will be set forth in part in the following description, or may be obvious from the description, or may be learned through practice of the technology.

In accordance with one embodiment, a combustor is provided. A combustor includes an end cover and a forward casing. The combustor further includes at least one fuel nozzle extending from the end cover and at least partially surrounded by the forward casing. A combustion liner extends between the at least one fuel nozzle and an aft frame. An outer sleeve spaced apart from and surrounding the combustion liner such that an annulus is defined therebetween. The combustion liner defines a combustion chamber having a primary combustion zone downstream from the at least one fuel nozzle and a secondary combustion zone downstream from the primary combustion zone. The combustor further includes a fuel injection assembly. The fuel injection assembly includes a fuel injector that extends through the outer sleeve, the annulus, and the combustion liner to the secondary combustion zone. A fuel supply conduit positioned outside of the outer sleeve. The fuel supply conduit extends to the fuel injector. The fuel injection assembly further includes a shielding assembly coupled to the outer sleeve and at least partially surrounding the fuel supply conduit. The shielding assembly includes a venturi nozzle having a circumferentially converging portion and a circumferentially diverging portion. At least one fuel sweep opening is defined in the outer sleeve and disposed within the shielding assembly.

In accordance with another embodiment, a turbomachine is provided. The turbomachine includes a compressor section, a turbine section, and a combustor. The combustor is disposed downstream from the compressor section and upstream from the turbine section. The combustor includes an end cover and a forward casing. The combustor further includes at least one fuel nozzle extending from the end cover and at least partially surrounded by the forward casing. A combustion liner extends between the at least one fuel nozzle and an aft frame. An outer sleeve spaced apart from and surrounding the combustion liner such that an annulus is defined therebetween. The combustion liner defines a combustion chamber having a primary combustion zone downstream from the at least one fuel nozzle and a secondary combustion zone downstream from the primary combustion zone. The combustor further includes a fuel injection assembly. The fuel injection assembly includes a fuel injector that extends through the outer sleeve, the annulus, and the combustion liner to the secondary combustion zone. A fuel supply conduit positioned outside of the outer sleeve. The fuel supply conduit extends to the fuel injector. The fuel injection assembly further includes a shielding assembly coupled to the outer sleeve and at least partially surrounding the fuel supply conduit. The shielding assembly includes a venturi nozzle having a circumferentially converging portion and a circumferentially diverging portion. At least one fuel sweep opening is defined in the outer sleeve and disposed within the shielding assembly.

These and other features, aspects and advantages of the present combustors and turbomachines will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present combustors and turbomachines, including the best mode of making and using the present systems and methods, directed to one of ordinary skill in the art, is set forth in the specification, which makes reference to the appended figures, in which.

DETAILED DESCRIPTION

Figure 1:
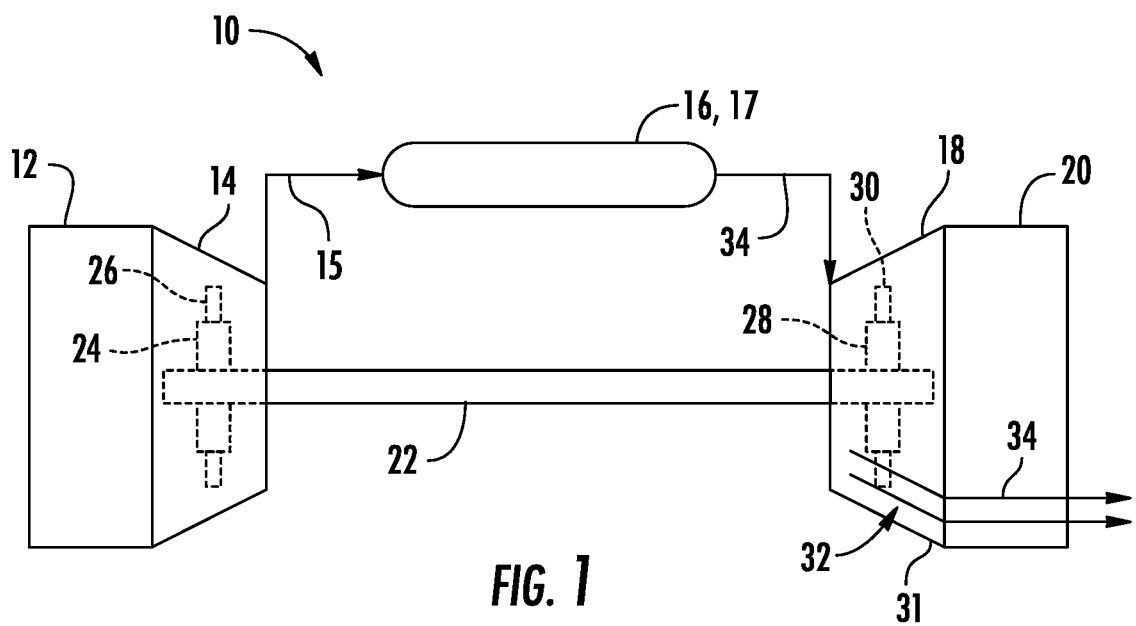
FIG. 1 is a schematic illustration of a turbomachine, in accordance with embodiments of the present disclosure.

Reference now will be made in detail to embodiments of the present combustors and turbomachines, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

As used herein, the terms "upstream" and "downstream" refer to the relative direction with respect to fluid flow in a fluid pathway. For example, "upstream" refers to the direction from which the fluid flows, and "downstream" refers to the direction to which the fluid flows. The terms "forward" and "aft," without any further specificity, refer to directions, with "forward" referring to the front or compressor end of the gas turbine, and "aft" referring to the rearward section of the gas turbine.

The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component. terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Referring now to the drawings, FIG. 1 illustrates a schematic diagram of one embodiment of a turbomachine, which in the illustrated embodiment is a gas turbine 10. Although an industrial or land-based gas turbine is shown and described herein, the present disclosure is not limited to a land based and/or industrial gas turbine unless otherwise specified in the claims. For example, the invention as described herein may be used in any type of turbomachine including but not limited to a steam turbine, an aircraft gas turbine, or a marine gas turbine.

As shown, gas turbine 10 generally includes an inlet section 12, a compressor section 14 disposed downstream of the inlet section 12, a plurality of combustors (not shown) within a combustor section 16 disposed downstream of the compressor section 14, a turbine section 18 disposed downstream of the combustor section 16, and an exhaust section 20 disposed downstream of the turbine section 18. Additionally, the gas turbine 10 may include one or more shafts 22 coupled between the compressor section 14 and the turbine section 18.

The compressor section 14 may generally include a plurality of rotor disks 24 (one of which is shown) and a plurality of rotor blades 26 extending radially outwardly from and connected to each rotor disk 24. Each rotor disk 24 in turn may be coupled to or form a portion of the shaft 22 that extends through the compressor section 14.

The turbine section 18 may generally include a plurality of rotor disks 28 (one of which is shown) and a plurality of rotor blades 30 extending radially outwardly from and being interconnected to each rotor disk 28. Each rotor disk 28 in turn may be coupled to or form a portion of the shaft 22 that extends through the turbine section 18. The turbine section 18 further includes an outer casing 31 that circumferentially surrounds the portion of the shaft 22 and the rotor blades 30, thereby at least partially defining a hot gas path 32 through the turbine section 18.

During operation, a working fluid such as air flows through the inlet section 12 and into the compressor section 14 where the air is progressively compressed, thus providing pressurized air or compressed air 15 to the combustors 17 of the combustor section 16. The compressed air 15 is mixed with fuel and burned within each combustor to produce combustion gases 34. The combustion gases 34 flow through the hot gas path 32 from the combustor section 16 into the turbine section 18, wherein energy (kinetic and/or thermal) is transferred from the combustion gases 34 to the rotor blades 30, causing the shaft 22 to rotate. The mechanical rotational energy may then be used to power the compressor section 14 and/or to generate electricity. The combustion gases 34 exiting the turbine section 18 may then be exhausted from the gas turbine 10 via the exhaust section 20.

Figure 2:
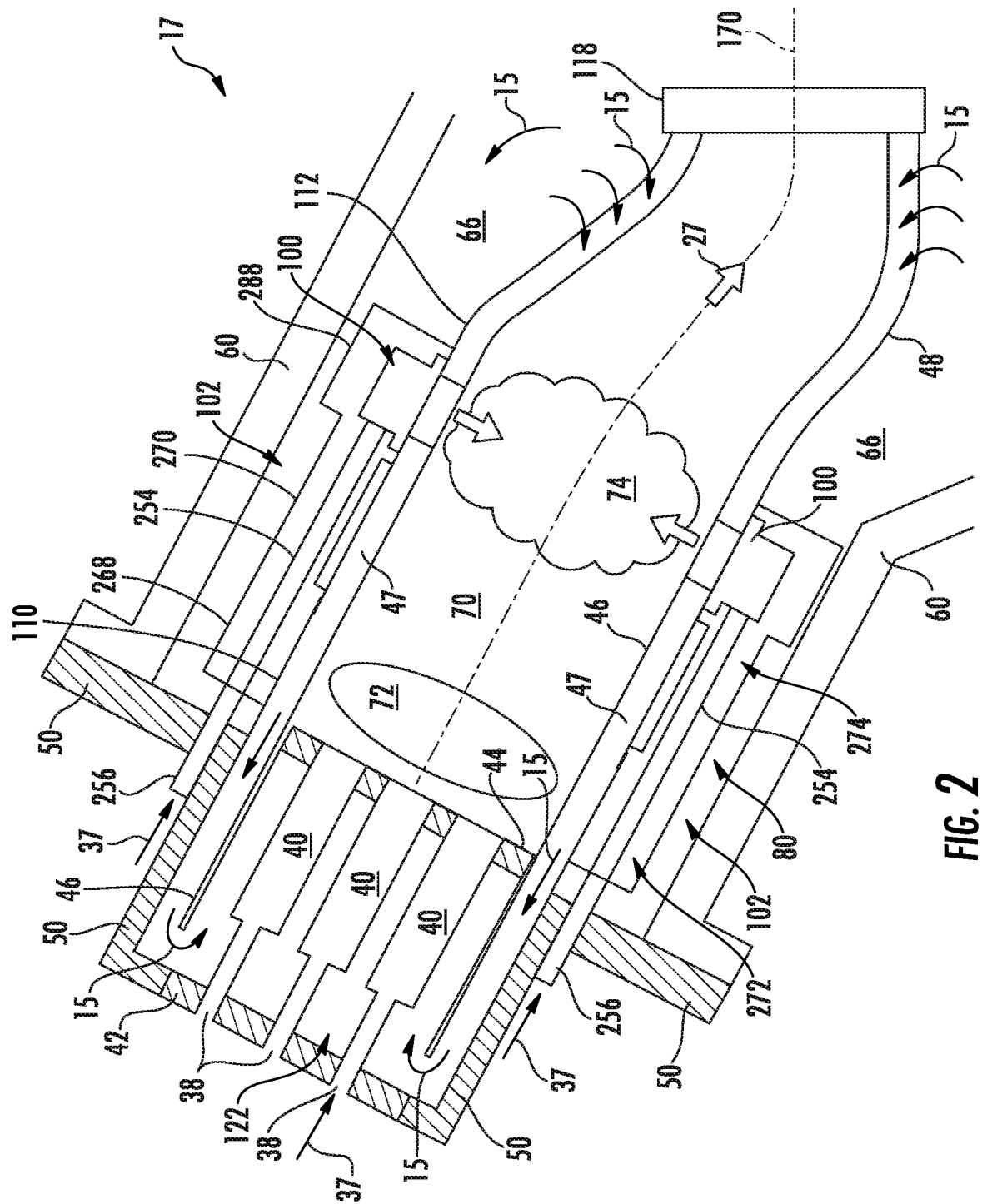
FIG. 2 illustrates a cross-sectional view of a combustor, in accordance with embodiments of the present disclosure.

FIG. 2 is a schematic representation of a combustor 17, as may be included in a can annular combustion system for the heavy-duty gas turbine 10. In a can annular combustion system, a plurality of combustors 17 (e.g., 8, 10, 12, 14, 16, or more) are positioned in an annular array about the shaft 22 that connects the compressor section 14 to the turbine section 18.

As shown in FIG. 2, the combustor 17 may define an axial direction A that extends along an axial centerline 170. The combustor may also define a circumferential direction C which extends around the axial direction A and the axial centerline 170. The combustor 17 may further define a radial direction R perpendicular to the axial direction A and the axial centerline 170.

FIG. 2 illustrates a combustor 17 having one or more exemplary fuel injection assemblies 80 or (also referred to as an axial fuel staging (AFS) system), as discussed further herein. The combustor 17 includes a combustion liner 46 that defines a combustion chamber 70. The combustion liner 46 may be positioned within (i.e., circumferentially surrounded by) an outer sleeve 48, such that an annulus 47 is formed therebetween. At least one fuel nozzle 40 may be positioned at the forward end of the combustor 17. Fuel 37 may be directed through fuel supply lines 38, which extend through an end cover 42, and into the fuel nozzles 40. The fuel nozzles 40 convey the fuel 37 and compressed air 15 into a primary combustion zone 72, where combustion occurs. In some embodiments, the fuel 37 and compressed air 15 are combined as a mixture prior to reaching the primary combustion zone 72.

The combustion liner 46 may contain and conveys combustion gases 27 to the turbine section 18. The combustion liner 46 defines the combustion chamber 70 within which combustion occurs. As shown in FIG. 2, the combustion liner may extend between the fuel nozzles 40 and an aft frame 118. The combustion liner 46 may have a cylindrical liner portion and a tapered transition portion that is separate from the cylindrical liner portion, as in many conventional combustion systems. Alternately, the combustion liner 46 may have a unified body (or "unibody") construction, in which the cylindrical portion and the tapered portion are integrated with one another. Thus, any discussion of the combustion liner 46 herein is intended to encompass both conventional combustion systems having a separate liner and transition piece and those combustion systems having a unibody liner. Moreover, the present disclosure is equally applicable to those combustion systems in which the transition piece and the stage one nozzle of the turbine are integrated into a single unit, sometimes referred to as a "transition nozzle" or an "integrated exit piece."

The combustion liner 46 may be surrounded by an outer sleeve 48, which is spaced radially outward of the combustion liner 46 to define an annulus 47 between the combustion liner 46 and the outer sleeve 48. In exemplary embodiments, the outer sleeve 48 may include a flow sleeve 110 at the forward end and an impingement sleeve 112 at the aft end. The flow sleeve 110 and the impingement sleeve 112 may be coupled to one another. For example, the flow sleeve 110 may include a first end or forward end that is coupled to the forward casing 50 and a second end or aft end that extends into and axially overlaps with a forward end of the impingement sleeve 112, such that an interference fit is formed between the impingement sleeve 112 and the flow sleeve 110. In many embodiments, the flow sleeve 110 extends between a forward casing 50 and the impingement sleeve 112. As shown, the impingement sleeve may extend between the flow sleeve 110 and the aft frame 118 of the combustor 17. Alternately, the outer sleeve 48 may have a unified body (or "unisleeve") construction, in which the flow sleeve 110 and the impingement sleeve 112 are integrated with one another in the axial direction. As before, any discussion of the outer sleeve 48 herein is intended to encompass both convention combustion systems having a separate flow sleeve 110 and impingement sleeve 112 and combustion systems having a unisleeve outer sleeve. However, in exemplary embodiments of the present disclosure, the combustor 17 includes a flow sleeve 110 and an impingement sleeve 112 as separate components coupled to one another.

In the exemplary embodiment, the combustion liner 46 is surrounded by an outer sleeve 48, thereby forming the annulus 47 therebetween through which compressed air 15 flows to the head end of the combustor 17. Heat is transferred convectively from the combustion liner 46 to the compressed air 15, thus cooling the combustion liner 46 and warming the compressed air 15. The combustion liner 46 may be formed with an upstream liner component and a downstream transition component. The liner component may be generally cylindrical, while the transition component may taper from a cylindrical forward end to a generally rectangular aft end.

The forward casing 50 and the end cover 42 of the combustor 17 may define a head end air plenum 122 and that includes one or more fuel nozzles 40. The fuel nozzles 40 may be any type of fuel nozzle, such as bundled tube fuel nozzles or swirler nozzles "swozzles." For example, the fuel nozzles 40 are positioned within the head end air plenum 122 defined by the forward casing 50. In many embodiments, the fuel nozzles 40 may extend from the end cover 42. For example, each fuel nozzle 40 may be coupled to an aft surface of the end cover 42 via a flange (not shown). As shown in FIG. 2, the at least one fuel nozzle 40 may be partially surrounded by the combustion liner 46. The aft, or downstream ends, of the fuel nozzles 40 extend through a cap 44 that defines the upstream end of the combustion chamber 70.

The forward casing 50 is connected to a compressor discharge casing 60, which defines a high pressure plenum 66 around the combustion liner 46 and the outer sleeve 48. Compressed air 15 from the compressor section 14 travels through the high pressure plenum 66 and enters the combustor 17 via apertures (not shown) in the downstream end of the outer sleeve 48 (as indicated by arrows near an aft frame 49). Compressed air travels upstream through the annulus 47 and are turned by the end cover 42 to enter the fuel nozzles 40 and to cool the head end. In particular, compressed air 15 flows from high pressure plenum 66 into the annulus 47 at an aft end of the combustor 17, via openings defined in the outer sleeve 48. The compressed air 15 travels upstream from the aft end of the combustor 17 to the head end air plenum 122, where the compressed air 15 reverses direction and enters the fuel nozzles 40.

In the exemplary embodiment, a fuel injection assembly 80 is provided to deliver a second fuel/air mixture to a secondary combustion zone 74. For example, a second flow of fuel and air may be introduced by one or more fuel injection assemblies 80 to the secondary combustion zone 74. The secondary combustion zone 74 may be defined by the combustion liner 46 and positioned downstream from the primary combustion zone 72. Such a combustion system having axially separated combustion zones is described as an "axial fuel staging" (AFS) system. The fuel injection assemblies 80 may be circumferentially spaced apart from one another on the outer sleeve 48 (e.g., equally spaced apart in some embodiments). In many embodiments, the combustor 17 may include four fuel injection assemblies 80 spaced apart from one another and configured to inject a second mixture of fuel and air into a secondary combustion zone 74, in order to increase the combustion gases 34 and temperature thereof. In other embodiments, the combustor 17 may include any number of fuel injection assemblies 80 (e.g., 1, 2, 3, or up to 10).

As shown in FIG. 2 each fuel injection assembly 80 may include a fuel injector 100 and a fuel supply conduit 254 that supplies fuel to the fuel injector 100 (e.g., gaseous fuel). Each fuel injector 100 may extend through the outer sleeve 48, the annulus 47, and the combustion liner 46 and into the secondary combustion zone 74. For example, the fuel injectors 100 may each extend radially from the high pressure plenum 66, through the outer sleeve 48, the annulus 47, and the combustion liner 46, such that the fuel injector 100 is capable of delivering a second flow of fuel and air to the secondary combustion zone 74. The fuel injectors 100 may be coupled to the combustion liner 46 and/or the outer sleeve 48, such that each fuel injector 100 introduces the second fuel/air mixture as a jet entering a cross-flow of the combustion products produced in the primary combustion zone 72. The second fuel/air mixture(s) are ignited by the combustion products from the primary combustion zone 72 and burn in the secondary combustion zone 74.

The fuel injector 100 may coupled to the outer sleeve 48 and may extend through the outer sleeve 48 and the combustion liner 46. In one embodiment, a boss (not shown) supporting the fuel injector 100 functions as a fastener for securing the outer sleeve 48 to the combustion liner 46. In other embodiments, the fuel injector 100 may be coupled to the outer sleeve 48 in any suitable manner, and the outer sleeve 48 may have any suitable number of components coupled between the flange of the forward casing 50 and the turbine nozzle in any suitable manner that permits the fuel injection assembly 80 to function as described herein. In addition to the fuel injectors 100, the fuel injection assemblies 80 further includes a shielding assembly 102 and fuel supply conduits 254 corresponding in number to the number of fuel injectors 100.

In exemplary embodiments, the fuel supply conduit 254 may be positioned outside of the outer sleeve 48. For example, the fuel supply conduit 254 may be positioned radially outward from the outer sleeve 48 and at least partially within the high pressure plenum 66. In many embodiments, as shown in FIG. 2, the fuel supply conduit 254 may be radially separated from the outer sleeve 48. In various embodiments, the fuel supply conduits 254 may extend generally axially along the outer sleeve 48 (e.g., generally parallel to the outer sleeve but radially spaced therefrom). As shown in FIG. 2, the fuel supply conduit 254 may extend between the forward casing 50 and the fuel injector 100. For example, the fuel supply conduit 254 may extend from an inlet 256 positioned outside of the high-pressure plenum 66, through the forward casing 50 and into the high pressure plenum 66, to the fuel injector 100. In this way, the fuel injection assemblies 80 may receive fuel via the inlets 256 and carry the fuel via the fuel supply conduit 254, which is positioned outside the combustor 17, to the fuel injectors 100 that inject the fuel with air into the secondary combustion zone 74.

Figure 4:
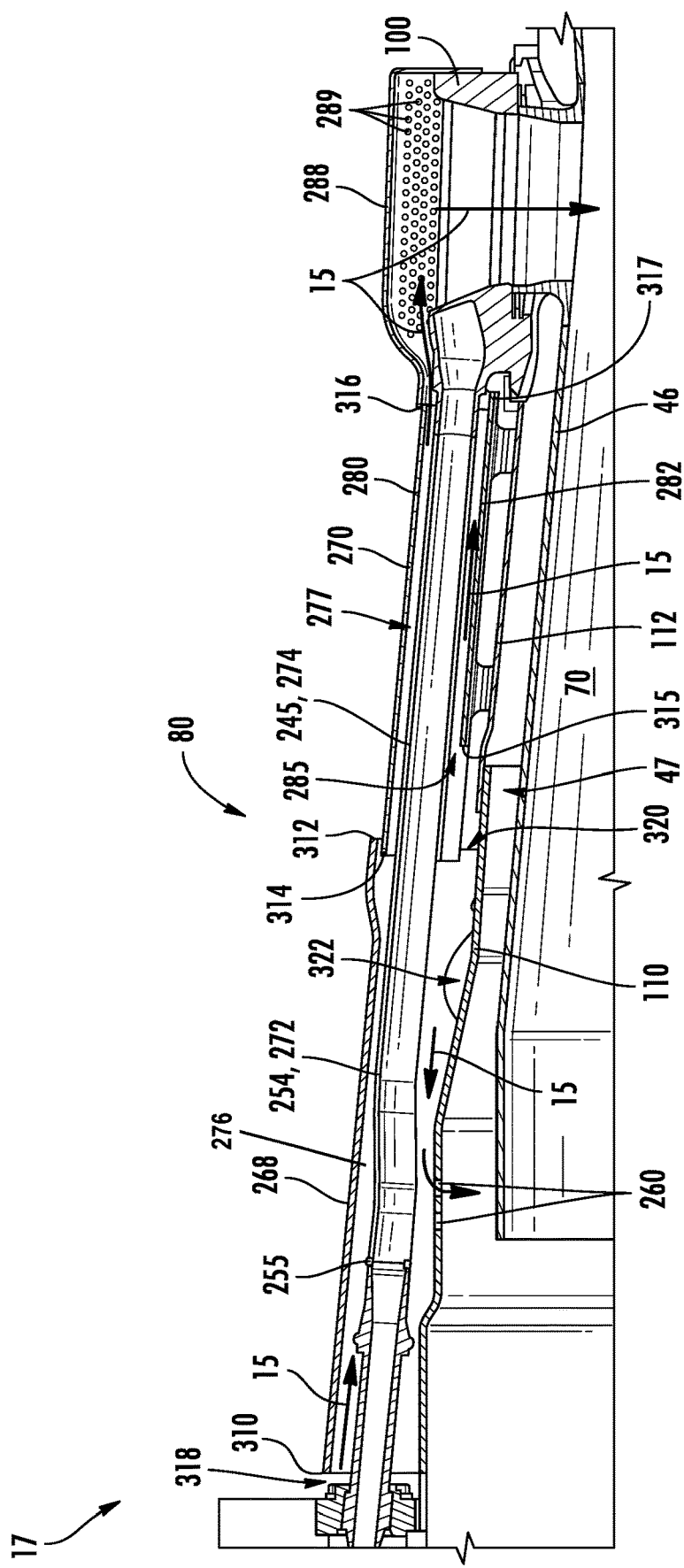
FIG. 4 illustrates an enlarged cross-sectional view of a combustor having a fuel injection assembly, in accordance with embodiments of the present disclosure.

In particular embodiments, the fuel supply conduit may include a forward portion 272 and an aft portion 274 (FIG. 4). The forward portion 272 of the fuel supply conduit 254 may extend along the flow sleeve 110. For example, the forward portion 272 of the fuel supply conduit 254 may co-extend generally axially with the flow sleeve 110. Similarly, and the aft portion 274 of the fuel supply conduit 254 may extend generally along the impingement sleeve 112. For example, the aft portion 274 of the fuel supply conduit 254 may co-extend generally axially with the flow sleeve 110.

The shielding assemblies 102 at least partially surround, and are located radially outward of, the fuel injectors 100 and the fuel supply conduit 254 to create protective environments around the fuel injectors 100 and the fuel supply conduit 254. The shielding assemblies 102 protect the fuel supply conduit 254 from damage or dislocation, as may occur during the handling, installation, or maintenance of the combustor 17. The shielding assemblies 102 may be secured to the outer surface of the outer sleeve 48 by mechanical fasteners or by welding or other joining techniques. Alternately, or additionally, the shielding assembly 102 may be secured to the fuel injector 100.

Fuel 37 enters through the inlet 256 of the fuel supply conduit 252, which may extend through and/or may be coupled to the forward casing 50 (specifically, the casing flange) or to some other convenient location. The fuel injector 100 mixes fuel 37 with compressed air 15 and injects the second fuel/air mixture into combustion chamber 70 at the secondary (downstream) combustion zone 74. The first fuel/air mixture and second fuel/air mixture are ignited inside combustion chamber 70 to generate a flow of combustion gases 27 that are channeled to the turbine section 18.

In some instances, fuel leaks may occur in various components of the fuel injection assemblies 80, such as in the fuel injectors 100 and particularly in the fuel supply conduits 254 (particularly at one or more weld joints 255). Accordingly, the present fuel injection assemblies 80 and combustors 17 provides a means for preventing said fuel leaks from contacting any hot surfaces of the combustor 17, which could otherwise cause the leaked fuel to auto ignite outside of the combustion chamber 70 and potentially damage the combustor 17.

Figure 3:
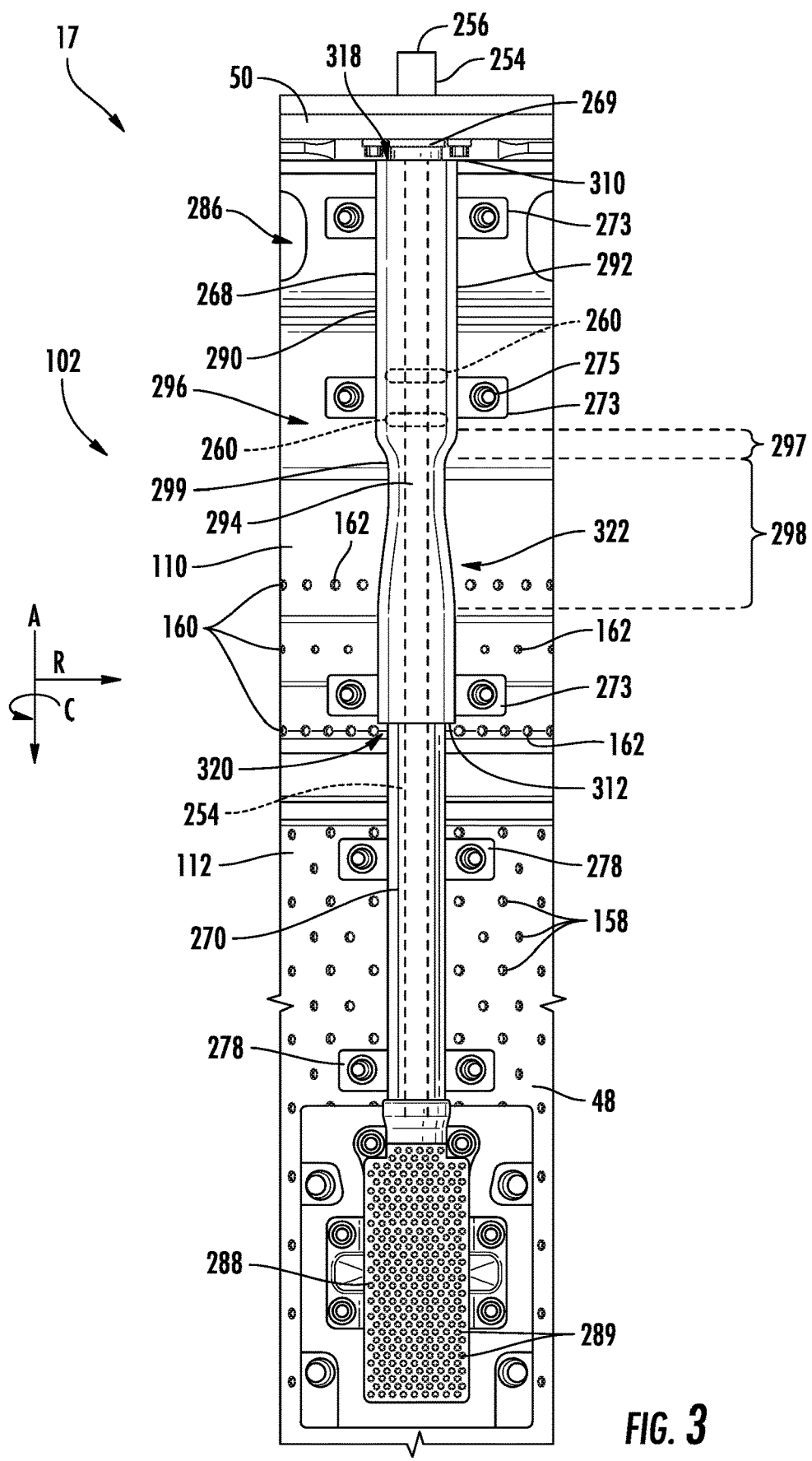
FIG. 3 illustrates an enlarged view of a combustor having a fuel injection assembly, in accordance with embodiments of the present disclosure.
Figure 5:
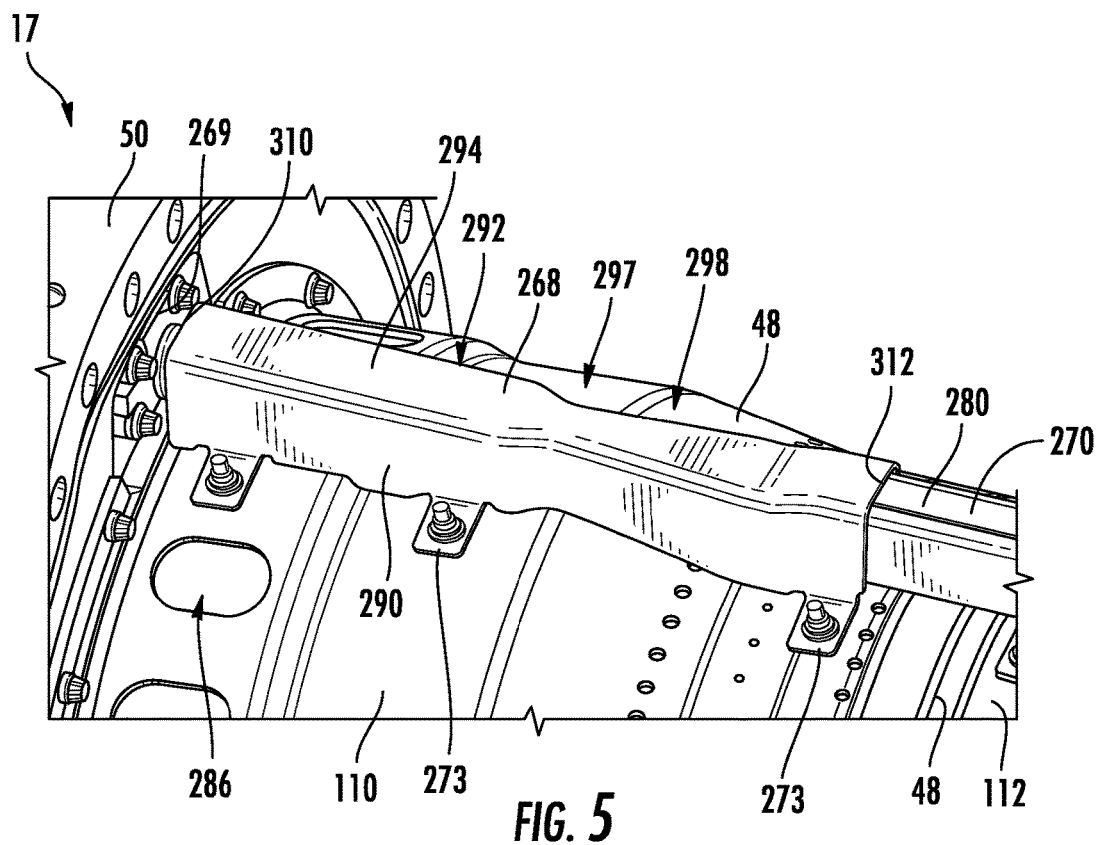
FIG. 5 illustrates an enlarged perspective view of a forward tube shield installed on a combustor, in accordance with embodiments of the present disclosure.
Figure 6:
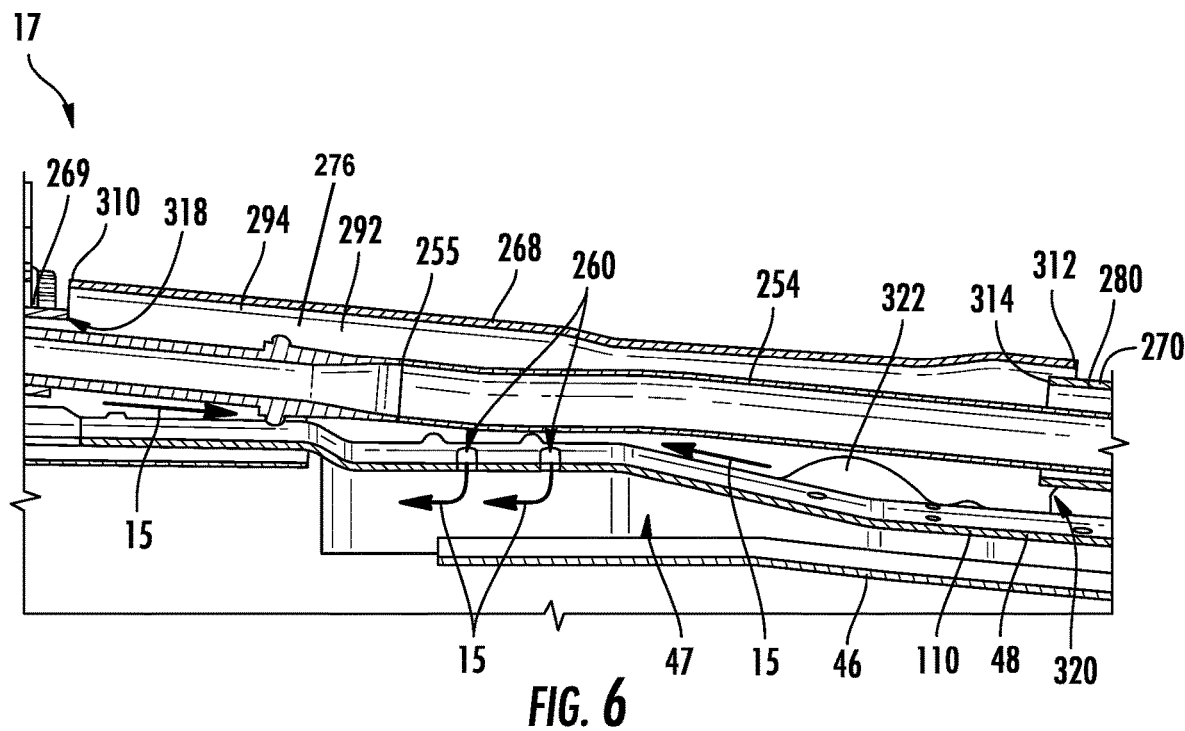
FIG. 6 illustrates an enlarged cross-sectional view of a forward tube shield installed on a combustor, in accordance with embodiments of the present disclosure.
Figure 7:
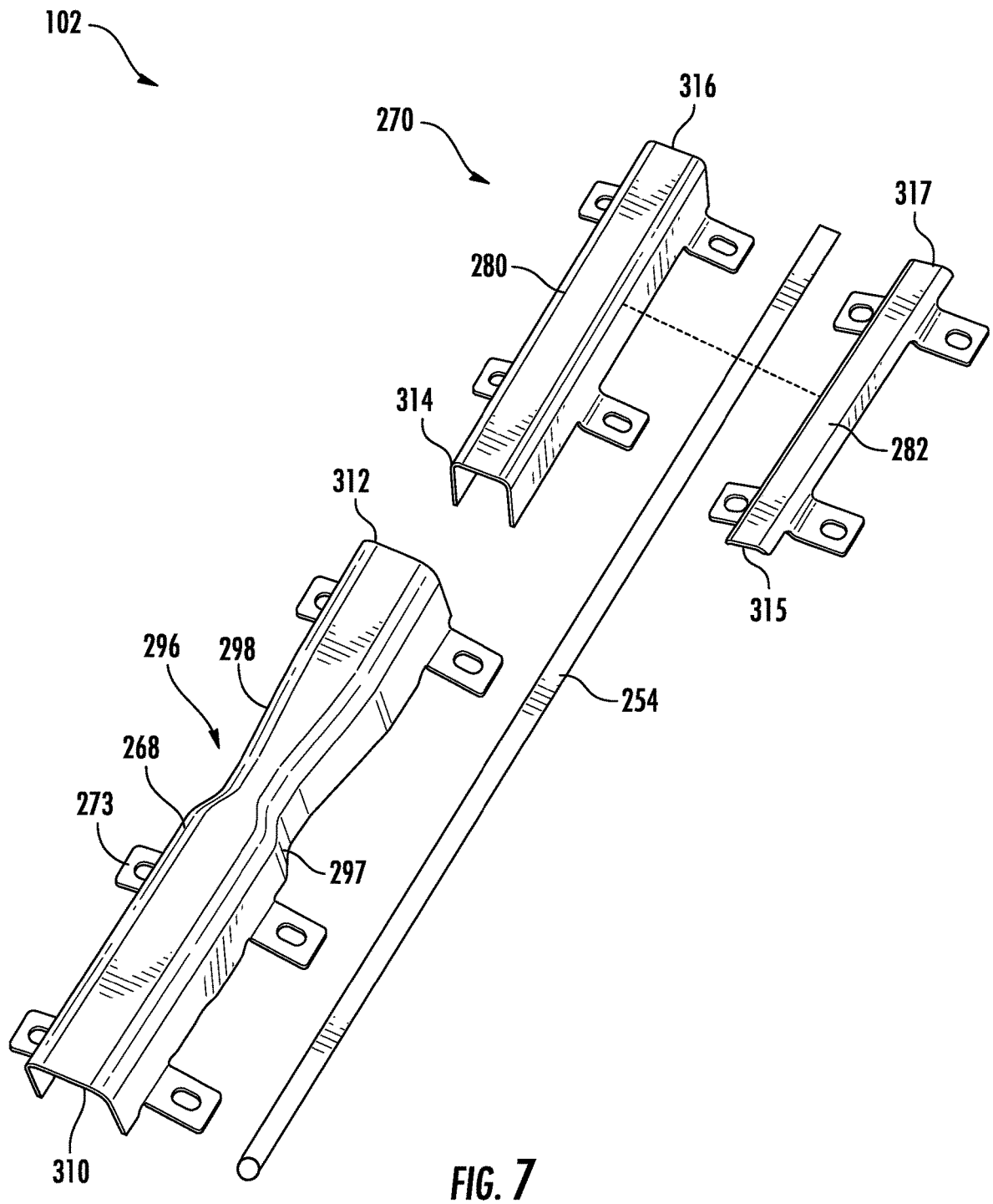
FIG. 7 illustrates an exploded view of a shielding assembly and a fuel supply conduit decoupled from a combustor, in accordance with embodiments of the present disclosure.

FIG. 3 illustrates an enlarged view of combustor 17 having a fuel injection assembly 80, which is viewed from radially outward of the outer sleeve 48 and at a circumferential location of the fuel injection assembly 80. FIG. 4 illustrates a cross sectional view of the combustor 17 of FIG. 4, in accordance with embodiments of the present disclosure. FIG. 5 illustrates an enlarged perspective view of the forward tube shield 268 installed on a combustor 17. FIG. 6 illustrates an enlarged cross-sectional view of the forward tube shield 268 installed on a combustor 17. Additionally, FIG. 7 illustrates an exploded view of the shielding assembly 102 and a fuel supply conduit 254 decoupled from a combustor 17, in accordance with embodiments of the present disclosure.

In many embodiments, as discussed above and shown in FIGS. 3 and 4, the outer sleeve 48 may include a flow sleeve 110 and an impingement sleeve 112 coupled to one another. the flow sleeve 110 may extend between the forward casing 50 and the impingement sleeve 112, and the impingement sleeve 112 may extend between the flow sleeve 110 and an aft frame 118 of the combustor 17. The flow sleeve 110 may be inserted axially into the impingement sleeve 112 (such that they axially overlap with one another). For example, an outer surface of the flow sleeve 110 may form an interference fit (or friction fit) with the interior surface of the impingement sleeve 112.

As shown best in FIGS. 3 and 4 (shown as a dashed line in FIG. 3), the outer sleeve 48 of the combustor 17 may define at least one fuel sweep openings 260 (such as multiple fuel sweep openings in some embodiments) inward of the fuel supply conduit 254. For example, the at least one fuel sweep openings 260 may be disposed radially inward of the fuel supply conduit 254 and circumferentially aligned with the fuel supply conduit 254. For example, an axial centerline of the fuel supply conduit 254 may be aligned with and generally parallel to an axial centerline of the fuel sweep opening 260. In exemplary embodiments, the fuel sweep opening 260 may be defined in the flow sleeve 110 of the outer sleeve 48.

For example, each fuel sweep opening 260 may be a slot or geometric stadium shaped opening (rectangle having circular ends) defined in the flow sleeve 110 directly radially inward of the fuel supply conduit 254. In exemplary embodiments, the fuel sweep opening 260 may be partially housed (or entirely housed in some embodiments) within the forward tube shield 268, such that the fuel sweep opening 260 is not directly exposed to the high-pressure plenum 66. The fuel sweep opening 260 may define a major axis and a minor axis that are mutually perpendicular to one another, with the major axis being longer than the minor axis. The major axis and the minor axis may each extend across the fuel sweep opening 260 and through the center point of the fuel sweep opening 260. The longest length of the fuel sweep opening 260 may be defined along the major axis (e.g., the major axis may extend from one circular end of the fuel sweep opening to the other circular end). The minor axis of the fuel sweep opening may be generally parallel to the axial direction A and generally parallel to an axial centerline (not shown) of the fuel supply conduit 254. In this way, the minor axis of each fuel sweep opening 260 may be disposed directly radially inward of the fuel supply conduit 254 and generally parallel to the axial centerline of the fuel supply conduit 254.

As shown in FIGS. 3 and 4, both the flow sleeve 110 and the impingement sleeve 112 may define impingement apertures 158, 162 that provide for fluid communication between the high-pressure plenum 66 and the annulus 47 of the combustor 17. For example, the impingement sleeve 112 may define a plurality of impingement apertures 158 in an irregularly arranged array (or scattered arrangement) on the impingement sleeve 112, such that compressed air 15 may enter the annulus 47 through each of the impingement apertures 158. Although only a portion of the impingement sleeve 112 is shown in FIGS. 3 and 4, the impingement apertures 158 may be spaced apart and defined circumferentially (e.g., defined in the impingement sleeve 112 at each circumferential location) around the axial centerline 170 of the combustor. In this way, a circumferentially uniform flow of compressed air 15 may be supplied into the annulus 47, which may advantageously increase the operating efficiency of the combustor 17.

In various embodiments, the flow sleeve 110 may define multiple rows 160 of impingement apertures 162 in the circumferential direction of the combustor 17. As shown in FIG. 3, The multiple rows 160 of impingement apertures 162 may be axially spaced apart from one another. In exemplary embodiments, the multiple rows 160 of impingement apertures 162 may fluidly couple the high-pressure plenum 66 to the annulus 47. As shown in FIG. 3, each impingement aperture 162 in a row 160 may be circumferentially spaced apart and at a similar axial location, such that each impingement apertures 162 in a row 160 is positioned on a common circumferentially extending line. The rows 160 of impingement apertures 162 defined within the flow sleeve 110 may increase the flow uniformity of compressed air 15 within the annulus 47 by introducing a circumferentially uniform flow of compressed air at varying axial locations, thereby increasing the efficiency of the combustor 17.

In exemplary embodiments, the fuel sweep opening 260 may be positioned upstream of the multiple rows 160 of impingement apertures 162 with respect to the flow of combustion gases 34 through the combustor 17. In many embodiments, the fuel sweep opening 260 may be larger than the impingement apertures 158 and 162 (e.g., may have a larger area), in order to induce a strong flow of compressed air 15 through the forward tube shield 268. In many embodiments, the multiple rows 160 of impingement apertures 162 may be axially spaced apart from one another. Additionally, the fuel sweep opening 260 may be positioned closer to the end cover 42 than the multiple rows 160 of impingement apertures 162.

In some embodiments, the flow sleeve 110 may define a plurality of openings 286 upstream from both the multiple rows 160 of impingement apertures 162 and the fuel sweep opening 260 with respect to the flow of combustion gases 34 within the combustor 17. For example, the plurality of openings 286 may be circumferentially spaced (e.g., equally spaced) apart from one another around the entire flow sleeve 110, with the exception of the circumferential location of the fuel injection assemblies 80, where no opening 286 is defined. In many embodiments, the plurality of openings 286 may be disposed axially between the forward casing 50 and the fuel sweep opening 260.

In various embodiments, as shown in FIGS. 3-7, the shielding assembly 102 may further include a forward tube shield 268 and an aft tube shield 270 that each surround a portion the fuel supply conduit 254 and define respective flow passages 276, 277. In many embodiments, the forward tube shield 268 may be coupled (e.g., directly coupled) to the flow sleeve 110, and the aft tube shield 270 may be coupled (e.g., directly coupled) to the impingement sleeve 112.

In many embodiments, the forward tube shield 268 and the flow sleeve 110 may collectively surround a forward portion 272 of the fuel supply conduit 254. The at least one fuel sweep opening 260 may be defined in the flow sleeve 110 and disposed within the forward tube shield 268, such that the first flow passage 276 is defined within the forward tube shield 268. The first flow passage 276 be in fluid communication with both the at least one fuel sweep opening 260 and the high pressure plenum 66. For example, the first flow passage 276 may receive compressed air 15 from the high pressure plenum 66 and expel the compressed air 15 into the annulus 47 via the fuel sweep opening(s) 260. The forward tube shield 268 may extend axially from proximate a mounting flange 269 to the aft tube shield 270. The mounting flange 269 may couple the fuel injection assembly 80 to the forward casing 50.

The aft tube shield 270 may surround the aft portion 274 of the fuel supply conduit 254, such that the second flow passage 277 is defined within the aft tube shield 270. The second flow passage 277 be in fluid communication with both the injector 100 and the high pressure plenum 66. For example, the second flow passage 277 may receive compressed air 15 from the high pressure plenum 66 and expel the compressed air 15 into the combustion chamber 70. The aft tube shield 270 may extend axially between the forward tube shield 268 and an inlet flow conditioner 288.

In particular embodiments, the forward tube shield 268 and the flow sleeve 110 may collectively define the boundary of the first flow passage 276. For example, the forward tube shield 268 may be flush with, and contact, the flow sleeve 110 on either side of the fuel supply conduit 254 as the forward tube shield 268 co-extends generally axially with the flow sleeve 110. In this way, the flow sleeve 110 and the forward tube shield 268 may collectively define the first flow passage 276. The forward tube shield 268 may define a multiple inlets 318, 320, 322 to the first flow passage 276, each of which may be in direct fluid communication with the high-pressure plenum 66.

In particular, the forward tube shield 268 may include a first radial wall 290, a second radial wall 292 spaced apart from the first radial wall and disposed on an opposite side of the fuel supply conduit 254, and a circumferential wall 294 extending between the first radial wall 290 and the second radial wall 292. The first radial wall 292 may extend generally radially outward from the exterior surface of the flow sleeve 110 to the circumferential wall 294. In other words, the first radial wall 292 may be in flush contact with the exterior surface of the flow sleeve 110 and disposed on a first side of the fuel supply conduit 254. The second radial wall 292 may extend generally radially outward from the exterior surface of the flow sleeve 110 to the circumferential wall 294. In other words, the second radial wall 292 may be in flush contact with the exterior surface of the flow sleeve 110 and disposed on a second side of the fuel supply conduit 254. The first radial wall 290, the second radial wall 292, the circumferential wall 294 and the flow sleeve 110 may collectively surround the forward portion 272 of the fuel supply conduit 254 (e.g., may collectively extend 360 degrees around the fuel supply conduit 254), such that the first flow passage 276 is defined around the forward portion 272 of the fuel supply conduit 254.

In many embodiments, as shown, both the forward tube shield 268 and the aft tube shield may extend axially from respective forward ends 310, 314 to respective aft ends 312, 316, which define the terminal ends of the shields 268, 270 in the axial direction A. For example, the forward tube shield 268 may extend axially from a forward end 310 proximate the mounting flange 269 to an aft end 312 disposed forward of the impingement sleeve 112. Similarly, the aft tube shield 270 may extend axially from a forward end 314 to an aft end 316. More particularly, as discussed below, the aft tube shield 270 may include a roof portion 280 and a floor portion 282 that couple to one another and collectively surround a portion of the fuel supply conduit 254 to define a second flow passage 277. In such embodiments, the roof portion 280 may extend from the forward end 314 to the aft end 316, and the floor portion 282 may extend separately from a forward end 315 to and aft end 317. As shown in FIG. 4, the forward end 315 of the floor portion 282 may be axially offset from the forward end 314 of the roof portion 280 to define the inlet 285 to the second flow passage 277.

In various embodiments, as shown best in FIG. 4, the forward tube shield 268 may be spaced apart from and axially overlap the aft tube shield 270. For example, the forward end 314 of the aft tube shield 270 may extend axially into the forward tube shield 310 (e.g., without contacting the forward tube shield 310 to allow space for compressed air 15 to enter the first flow passage 276). Particularly, although the tube shields 268 and 270 axially overlap one another, they do not contact one another. For example, the aft end 312 of the forward tube shield 268 may be entirely spaced apart from the aft tube shield 270, thereby advantageously allowing for compressed air 15 to uniformly enter the first flow passage 276 defined by the forward tube shield 268 and the flow sleeve 110 at the aft end 312 of the forward tube shield 268.

In many embodiments, the forward tube shield 268 may define a first inlet 318 at the forward end 310 of the forward tube shield 268, a second inlet 320 at the aft end 312 of the forward tube shield 268, and a third inlet 322 between the forward end 310 and the aft end 312 of the forward tube shield 268. For example, the third inlet 322 may be defined in either the first radial wall 290, the second radial wall 292, or the circumferential wall 294 at a location between the forward end 310 and the aft end 312 of the forward tube shield. In exemplary embodiments, as shown in FIG. 4, the third inlet 322 may be defined in the second radial wall 292 aft of the fuel sweep opening(s) 260, such that compressed air 15 entering the third inlet 322 flows opposite the axial direction A towards the fuel sweep opening(s) 260.

Each of the inlets 318, 320, 322 may provide a separate entrance for compressed air 15 from the high pressure plenum 66 to flow into the first flow path 276. In particular implementations, all of the compressed air 15 within the first flow path 276 may flow towards the fuel sweep openings 260. For example, compressed air 15 entering the first inlet 318 may flow in the axial direction A towards the fuel sweep openings 260. Oppositely, compressed air 15 entering the second inlet 320 or third inlet 322 may flow opposite the axial direction A towards the fuel sweep openings 260. In this way, the fuel sweep openings 260 may induce airflow within the forward tube shield 268 in opposite directions.

In exemplary embodiments, the shielding assembly 102 may further include a venturi nozzle 296 having a circumferentially converging portion 297 and a circumferentially diverging portion 298. In particular, the venturi nozzle 296 may be defined by the forward tube shield 268 immediately aft of the fuel sweep openings 260. As shown, the circumferentially converging portion 297 may converge circumferentially inwardly while extending in the downstream (or axial) direction. In other words, in the circumferentially converging portion 297, the first radial wall 290 and the second radial wall 292 may taper or converge towards one another as they extend in the axial direction A. For example, the circumferential distance between the walls 290, 292 may decrease in the axial direction A in the circumferentially converging portion 297.

Oppositely, the circumferentially diverging portion 298 may diverge circumferentially outwardly while extending in the downstream (or axial) direction. In other words, in the circumferentially diverging portion 298, the first radial wall 290 and the second radial wall 292 may taper or diverge away from one another as they extend in the axial direction A. For example, the circumferential distance between the walls 290, 292 may increase in the axial direction A in the circumferentially diverging portion 298. In many embodiments, the circumferentially diverging portion 298 may extend directly from the circumferentially converging portion 297, such that a throat 299 may be defined between the circumferentially converging portion 297 and the circumferentially diverging portion 298. The throat 299 may define the smallest circumferential length (and smallest cross-sectional area) of the forward tube shield 268.

In this way, the circumferentially converging portion 297 and the circumferentially diverging portion 298 may collectively define the venturi nozzle 296, which advantageously ensures that all of the compressed air 15 within the forward tube shield 268 is directed towards one of the fuel sweep openings 260 by creating a pressure differential within the first flow passage 276 (and ensures that the air does not flow beyond the fuel sweep openings 260).

In operation, the fuel sweep openings 260 may function to induce a flow of compressed air 15 within the first passage 276, which may advantageously sweep away any fuel leaks in the fuel supply conduit 254 during operation of the combustor 17. In particular embodiments, the fuel supply conduit 254 may include a weld joint 255 (e.g., where portions of the fuel supply conduit are jointed together). The weld joint 255 may be disposed proximate the fuel sweep openings 260, such that any fuel leaks from the weld joint 255 may be advantageously swept away by compressed air 15. For example, the flow of compressed air 15 within the forward tube shield 268 may carry leaked fuel from the fuel supply conduit 254 (particularly from the forward portion 272 of the fuel supply conduit 254) through the first flow passage 276, the fuel sweep opening 260, and into the annulus 47. In this way, any leaked fuel from the forward portion 272 of the fuel supply conduit 254 may get carried away (or swept away) by the first flow of compressed air 300 for eventual use in the one or more fuel nozzles 40. For example, any leaked fuel from the fuel supply conduit 254 will flow into first passage 276 and be swept away by the flow of compressed air 15, thereby eventually traveling to the one or more fuel nozzles 40 for use in the primary combustion zone 72. As such, the at least one fuel sweep openings 260 and the forward tube shield 268 ensure that leaked fuel from the forward portion 272 of the fuel supply conduit 254 does not travel to hot components of the combustor 17 (which could otherwise cause auto ignition of the leaked fuel and damage the combustor 17).

In particular embodiments, the aft tube shield 270 may include a roof portion 280 and a floor portion 282 that collectively define the boundary of the second flow passage 277. Both the roof portion 280 and the floor portion 282 may be radially spaced apart from the impingement sleeve 112. Although the roof portion 280 and the floor portion 282 are shown as two separate components that collectively form the aft tube shield 270, in some embodiments, the aft tube shield 270 may be a singular component that surrounds the aft portion 274 of the fuel supply conduit 254.

In many embodiments, the aft tube shield 270 may be spaced apart from both the flow sleeve 110 and the aft portion 274 of the fuel supply conduit 254, in order to define the second flow passage 277. For example, the aft tube shield 270 may annularly surround the aft portion 274 of the fuel supply conduit 254 and may co-extend generally axially with both the impingement sleeve 112 and the aft portion 274 of the fuel supply conduit 254. In various embodiments, the aft tube shield 270 may define an inlet 285 to the second flow passage 277 between the roof portion 280 and the floor portion 282 at a forward end of the aft tube shield 270, which may be in direct fluid communication with the high-pressure plenum 66. Compressed air 15 within the second flow passage 277 may flow from the inlet 285 towards the fuel injector 100.

In various embodiments, the fuel injection assembly 80 may further include an inlet flow conditioner 288 that generally surrounds the fuel injector 100. The inlet flow conditioner 288 may define a plurality of holes 289 that condition the compressed air 15 prior to entrance into the fuel injector 100, which advantageously increases the mixing of air and fuel within the fuel injector 100. As shown in FIG. 4, a forward end of the inlet flow conditioner 288 may axially overlap with and contact the roof portion 280 of the aft tube shield 270, in order to ensure that any fuel leakage in the aft portion 274 of the fuel supply conduit 254 safely passes into the fuel injector 100.

In exemplary embodiments, compressed air 15 from the high-pressure plenum 66 may enter the second flow passage 277 at the inlet 285 and exit the second flow passage 277 at the fuel injector 100. For example, the compressed air 15 within the second flow passage 277 may flow in the axial direction A towards the fuel injector 100. In this way, any leaked fuel within the aft portion 274 of the fuel supply conduit 254 may be swept away by the compressed air 15 within second flow passage 277 for eventual use within the fuel injector 100.

In operation, the fuel injector 100 may partially function to induce the flow of compressed air 15 within the second passage 277, which may advantageously sweep away any fuel leaks in the fuel supply conduit 254 during operation of the combustor 17. For example, the compressed air 15 within the second passage 277 may carry leaked fuel from the fuel supply conduit 254 (particularly from the aft portion 274 of the fuel supply conduit 254) into the fuel injector 100 for injection into the secondary combustion zone 74. As such, the aft tube shield 270 ensures that leaked fuel from the aft portion 274 of the fuel supply conduit 254 does not travel to hot components of the combustor 17 (which could otherwise cause auto ignition of the leaked fuel and damage the combustor 17).

In various embodiments, the forward tube shield 268 may include one or more flanges 273 that couple directly to the flow sleeve 210. For example, in some embodiments, the flanges 273 may define slots, through which one or more bolts 275 may extend and couple the flanges 273 to the flow sleeve 210 with threaded fasteners. In other embodiments, the flanges 273 may be welded or fixedly coupled to the flow sleeve 210. In exemplary embodiments, the flanges 273 may be integrally formed with the forward tube shield 268, such that the forward tube shield 268 and the flanges 273 are a singular component.

Similarly, the aft tube shield 270 may include one or more attachment flanges 278, which may couple the aft tube shield 270 to the impingement sleeve 112. As shown in FIGS. 3 and 4, the attachment flanges 278 may be integrally formed as a single component with the aft tube shield 270. The attachment flange 278 may support and couple the aft tube shield 270 to the impingement sleeve 112 (e.g., via a bolt and threaded fastener, a weld, or other suitable coupling means).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A combustor comprising: an end cover; at least one fuel nozzle extending from the end cover and at least partially surrounded by a combustion liner, the combustion liner extending from the at least one fuel nozzle toward an aft frame, wherein the combustion liner defines a combustion chamber having a primary combustion zone downstream from the at least one fuel nozzle and a secondary combustion zone downstream from the primary combustion zone; an outer sleeve spaced apart from and surrounding the combustion liner such that an annulus is defined therebetween; and a fuel injection assembly, the fuel injection assembly comprising: a fuel injector extending through the outer sleeve, the annulus, and the combustion liner to the secondary combustion zone; a fuel supply conduit positioned outside of the outer sleeve, the fuel supply conduit extending to the fuel injector; and a shielding assembly coupled to the outer sleeve and at least partially surrounding the fuel supply conduit, wherein the shielding assembly includes a venturi nozzle having a circumferentially converging portion and a circumferentially diverging portion, wherein at least one fuel sweep opening is defined in the outer sleeve immediately forward of the venturi nozzle, and wherein the at least one fuel sweep opening is disposed within the shielding assembly.

The combustor as in one or more of these clauses, wherein the shielding assembly comprises a forward tube shield and an aft tube shield, and wherein venturi nozzle is defined by the forward tube shield.

The combustor as in one or more of these clauses, wherein the forward tube shield is spaced apart from and axially overlaps the aft tube shield.

The combustor as in one or more of these clauses, wherein the forward tube shield is coupled to a flow sleeve of the outer sleeve, and wherein the forward tube shield and the flow sleeve collectively define a first flow passage in fluid communication with the fuel sweep opening.

The combustor as in one or more of these clauses, the forward tube shield defining a first inlet at a forward end of the forward tube shield, a second inlet at an aft end of the forward tube shield, and a third inlet between the forward end and the aft end of the forward tube shield.

The combustor as in one or more of these clauses, wherein the outer sleeve comprises a flow sleeve and an impingement sleeve coupled to one another, wherein the flow sleeve extends between the forward casing and the impingement sleeve, and wherein the impingement sleeve extends between the flow sleeve and an aft frame of the combustor.

The combustor as in one or more of these clauses, wherein the shielding assembly further comprises a forward tube shield coupled to the flow sleeve, the forward tube shield and the flow sleeve collectively surrounding a forward portion of the fuel supply conduit such that a first flow passage is defined by the forward tube shield, wherein the fuel sweep opening is disposed within the forward tube shield.

The combustor as in one or more of these clauses, wherein the shielding assembly further comprises an aft tube shield that that annularly surrounds an aft portion of the fuel supply conduit such that a second flow passage is defined by the aft tube shield.

The combustor as in one or more of these clauses, wherein compressed air within the first flow passage travels towards the at least one fuel sweep opening, and wherein the compressed air within the second flow passage travels towards the fuel injector.

The combustor as in one or more of these clauses, wherein the shielding assembly further comprises a floor portion and a roof portion coupled to one another and collectively defining the second flow passage.

A turbomachine comprising: a compressor section; a turbine section; and a combustor disposed downstream from the compressor section and upstream from the turbine section, the combustor comprising: an end cover; at least one fuel nozzle extending from the end cover and at least partially surrounded by a combustion liner, the combustion liner extending from the at least one fuel nozzle toward an aft frame, wherein the combustion liner defines a combustion chamber having a primary combustion zone downstream from the at least one fuel nozzle and a secondary combustion zone downstream from the primary combustion zone; an outer sleeve spaced apart from and surrounding the combustion liner such that an annulus is defined therebetween; and a fuel injection assembly, the fuel injection assembly comprising: a fuel injector extending through the outer sleeve, the annulus, and the combustion liner to the secondary combustion zone; a fuel supply conduit positioned outside of the outer sleeve, the fuel supply conduit extending to the fuel injector; and a shielding assembly coupled to the outer sleeve and at least partially surrounding the fuel supply conduit, wherein the shielding assembly includes a venturi nozzle having a circumferentially converging portion and a circumferentially diverging portion, wherein at least one fuel sweep opening is defined in the outer sleeve immediately forward of the venturi nozzle, and wherein the at least one fuel sweep opening is disposed within the shielding assembly.

The turbomachine as in claim 11, wherein the shielding assembly comprises a forward tube shield and an aft tube shield, and wherein venturi nozzle is defined by the forward tube shield.

The turbomachine as in one or more of these clauses, wherein the forward tube shield is spaced apart from and axially overlaps the aft tube shield.

The turbomachine as in one or more of these clauses, wherein the forward tube shield is coupled to a flow sleeve of the outer sleeve, and wherein the forward tube shield and the flow sleeve collectively define a first flow passage in fluid communication with the fuel sweep opening.

The turbomachine as in one or more of these clauses, the forward tube shield defining a first inlet at a forward end of the forward tube shield, a second inlet at an aft end of the forward tube shield, and a third inlet between the forward end and the aft end of the forward tube shield.

The turbomachine as in one or more of these clauses, wherein the outer sleeve comprises a flow sleeve and an impingement sleeve coupled to one another, wherein the flow sleeve extends between the forward casing and the impingement sleeve, and wherein the impingement sleeve extends between the flow sleeve and an aft frame of the combustor.

The turbomachine as in one or more of these clauses, wherein the shielding assembly further comprises a forward tube shield coupled to the flow sleeve, the forward tube shield and the flow sleeve collectively surrounding a forward portion of the fuel supply conduit such that a first flow passage is defined by the forward tube shield, wherein the fuel sweep opening is disposed within the forward tube shield.

The turbomachine as in one or more of these clauses, wherein the shielding assembly further comprises an aft tube shield that that annularly surrounds an aft portion of the fuel supply conduit such that a second flow passage is defined by the aft tube shield.

The turbomachine as in one or more of these clauses, wherein compressed air within the first flow passage travels towards the at least one fuel sweep opening, and wherein the compressed air within the second flow passage travels towards the fuel injector.

The turbomachine as in one or more of these clauses, wherein the shielding assembly further comprises a floor portion and a roof portion coupled to one another and collectively defining the second flow passage.

What is claimed is:

1. A combustor comprising:
    an end cover;
    at least one fuel nozzle extending from the end cover and at least partially surrounded by a combustion liner, the combustion liner extending from the at least one fuel nozzle toward an aft frame, wherein the combustion liner defines a combustion chamber having a primary combustion zone downstream from the at least one fuel nozzle and a secondary combustion zone downstream from the primary combustion zone;
    an outer sleeve spaced apart from and surrounding the combustion liner such that an annulus is defined therebetween; and
    a fuel injection assembly, the fuel injection assembly comprising:
        a fuel injector extending through the outer sleeve, the annulus, and the combustion liner to the secondary combustion zone;

a fuel supply conduit positioned outside of the outer sleeve, the fuel supply conduit extending to the fuel injector; and a shielding assembly coupled to the outer sleeve and at least partially surrounding the fuel supply conduit, wherein the shielding assembly includes a venturi nozzle having a circumferentially converging portion and a circumferentially diverging portion, wherein at least one fuel sweep opening is defined in the outer sleeve immediately forward of the venturi nozzle, and wherein the at least one fuel sweep opening is disposed within the shielding assembly.

2. The combustor as in claim 1, wherein the shielding assembly comprises a forward tube shield and an aft tube shield, and wherein the venturi nozzle is defined by the forward tube shield.

3. The combustor as in claim 2, wherein the forward tube shield is spaced apart from and axially overlaps the aft tube shield.

4. The combustor as in claim 2, wherein the forward tube shield is coupled to a flow sleeve of the outer sleeve, and wherein the forward tube shield and the flow sleeve collectively define a first flow passage in fluid communication with the fuel sweep opening.

5. The combustor as in claim 4, the forward tube shield defining a first inlet at a forward end of the forward tube shield, a second inlet at an aft end of the forward tube shield, and a third inlet between the forward end and the aft end of the forward tube shield.

6. The combustor as in claim 1, wherein the outer sleeve comprises a flow sleeve and an impingement sleeve coupled to one another, wherein the flow sleeve extends between a forward casing and the impingement sleeve, and wherein the impingement sleeve extends between the flow sleeve and the aft frame of the combustor.

7. The combustor as in claim 6, wherein the shielding assembly further comprises a forward tube shield coupled to the flow sleeve, the forward tube shield and the flow sleeve collectively surrounding a forward portion of the fuel supply conduit such that a first flow passage is defined by the forward tube shield, wherein the fuel sweep opening is disposed within the forward tube shield.

8. The combustor as in claim 7, wherein the shielding assembly further comprises an aft tube shield that that annularly surrounds an aft portion of the fuel supply conduit such that a second flow passage is defined by the aft tube shield.

9. The combustor as in claim 8, wherein compressed air within the first flow passage travels towards the at least one fuel sweep opening, and wherein the compressed air within the second flow passage travels towards the fuel injector.

10. The combustor as in claim 8, wherein the shielding assembly further comprises a floor portion and a roof portion coupled to one another and collectively defining the second flow passage.

11. A turbomachine comprising:
a compressor section;
a turbine section; and
a combustor disposed downstream from the compressor section and upstream from the turbine section, the combustor comprising:
an end cover;
at least one fuel nozzle extending from the end cover and at least partially surrounded by a combustion liner, the combustion liner extending from the at least one fuel nozzle toward an aft frame, wherein the combustion liner defines a combustion chamber having a primary combustion zone downstream from the at least one fuel nozzle and a secondary combustion zone downstream from the primary combustion zone;
an outer sleeve spaced apart from and surrounding the combustion liner such that an annulus is defined therebetween; and
a fuel injection assembly, the fuel injection assembly comprising:
a fuel injector extending through the outer sleeve, the annulus, and the combustion liner to the secondary combustion zone;
a fuel supply conduit positioned outside of the outer sleeve, the fuel supply conduit extending to the fuel injector; and
a shielding assembly coupled to the outer sleeve and at least partially surrounding the fuel supply conduit, wherein the shielding assembly includes a venturi nozzle having a circumferentially converging portion and a circumferentially diverging portion, wherein at least one fuel sweep opening is defined in the outer sleeve immediately forward of the venturi nozzle, and wherein the at least one fuel sweep opening is disposed within the shielding assembly.

12. The turbomachine as in claim 11, wherein the shielding assembly comprises a forward tube shield and an aft tube shield, and wherein the venturi nozzle is defined by the forward tube shield.

13. The turbomachine as in claim 12, wherein the forward tube shield is spaced apart from and axially overlaps the aft tube shield.

14. The turbomachine as in claim 12, wherein the forward tube shield is coupled to a flow sleeve of the outer sleeve, and wherein the forward tube shield and the flow sleeve collectively define a first flow passage in fluid communication with the fuel sweep opening.

15. The turbomachine as in claim 14, the forward tube shield defining a first inlet at a forward end of the forward tube shield, a second inlet at an aft end of the forward tube shield, and a third inlet between the forward end and the aft end of the forward tube shield.

16. The turbomachine as in claim 11, wherein the outer sleeve comprises a flow sleeve and an impingement sleeve coupled to one another, wherein the flow sleeve extends between a forward casing and the impingement sleeve, and wherein the impingement sleeve extends between the flow sleeve and aft frame of the combustor.

17. The turbomachine as in claim 16, wherein the shielding assembly further comprises a forward tube shield coupled to the flow sleeve, the forward tube shield and the flow sleeve collectively surrounding a forward portion of the fuel supply conduit such that a first flow passage is defined by the forward tube shield, wherein the fuel sweep opening is disposed within the forward tube shield.

18. The turbomachine as in claim 17, wherein the shielding assembly further comprises an aft tube shield that that annularly surrounds an aft portion of the fuel supply conduit such that a second flow passage is defined by the aft tube shield.

19. The turbomachine as in claim 18, wherein compressed air within the first flow passage travels towards the at least one fuel sweep opening, and wherein the compressed air within the second flow passage travels towards the fuel injector.

20. The turbomachine as in claim 18, wherein the shielding assembly further comprises a floor portion and a roof portion coupled to one another and collectively defining the second flow passage.

\* \* \* \* \*